United States Patent [19]

Wellendorf et al.

[11] 4,203,136
[45] May 13, 1980

[54] METHOD AND APPARATUS FOR ELECTRO-OPTICALLY SENSING, TRANSMITTING AND RECORDING PICTORIAL INFORMATION IN PARTICULAR FACSIMILE TRANSMISSION SYSTEMS

[75] Inventors: Klaus Wellendorf, Kitzeberg; Rüediger Sommer, Raisdorf, both of Fed. Rep. of Germany

[73] Assignee: Dr. Ing. Rudolf Hell GmbH, Fed. Rep. of Germany

[21] Appl. No.: 953,766

[22] Filed: Oct. 23, 1978

Related U.S. Application Data

[60] Division of Ser. No. 803,143, Jun. 3, 1977, which is a continuation-in-part of Ser. No. 679,087, Apr. 21, 1976, abandoned.

[30] Foreign Application Priority Data

Apr. 25, 1975 [DE] Fed. Rep. of Germany ....... 2518370

[51] Int. Cl.$^2$ .......................... H04N 1/40; H04N 1/18
[52] U.S. Cl. ..................................... 358/280; 358/256; 358/293; 358/294; 358/296
[58] Field of Search ............... 358/280, 260, 293, 256, 358/294, 296, 302; 346/35

[56] References Cited

U.S. PATENT DOCUMENTS

| Re. 29,067 | 12/1976 | Watson | 358/293 |
|---|---|---|---|
| 1,751,584 | 3/1930 | Hansell | 358/281 |
| 3,235,660 | 2/1966 | Treseder | 358/292 |
| 3,560,641 | 2/1971 | Taylor | 358/296 |
| 3,800,080 | 3/1974 | Fuwa | 358/280 |
| 3,803,631 | 4/1974 | Nucklos | 346/35 |
| 3,849,592 | 11/1974 | Rosenheck | 358/260 |
| 3,876,825 | 4/1975 | Murakami | 358/256 |
| 3,962,681 | 6/1976 | Requa | 358/293 |
| 3,988,742 | 10/1976 | Meier | 358/302 |
| 3,992,572 | 11/1976 | Nakagome | 358/260 |
| 4,004,079 | 1/1977 | Boston | 358/280 |
| 4,012,584 | 3/1977 | Gascoigne | 358/302 |
| 4,051,538 | 9/1977 | Fox | 358/296 |
| 4,084,195 | 4/1978 | Pereira | 358/280 |

FOREIGN PATENT DOCUMENTS 882428 11/1961 United Kingdom ................... 358/298

Primary Examiner—Howard W. Britton
Attorney, Agent, or Firm—Hill, Van Santen, Steadman, Chiara & Simpson

[57] ABSTRACT

A method and apparatus for electro-optically scanning a picture with a head having multiple electrical optical scanning devices which can be simultaneously moved across the picture and wherein the output of such scanning devices are alternately supplied to storage or memory devices which convert the information from the scanning devices into series arranged information corresponding to each scanning device and wherein during the time that the scanning devices are scanning certain portions of the picture and supplying information to a first set of storage or memory devices, information from a second group of storage or memory devices is being read out to a transmitter for transferring the data to a second location. The invention and method further include a receiver for receiving such information and includes a pair of plurality of storage devices one of which is receiving the incoming information and the other is supplying previously stored information to scanning writing heads.

5 Claims, 18 Drawing Figures

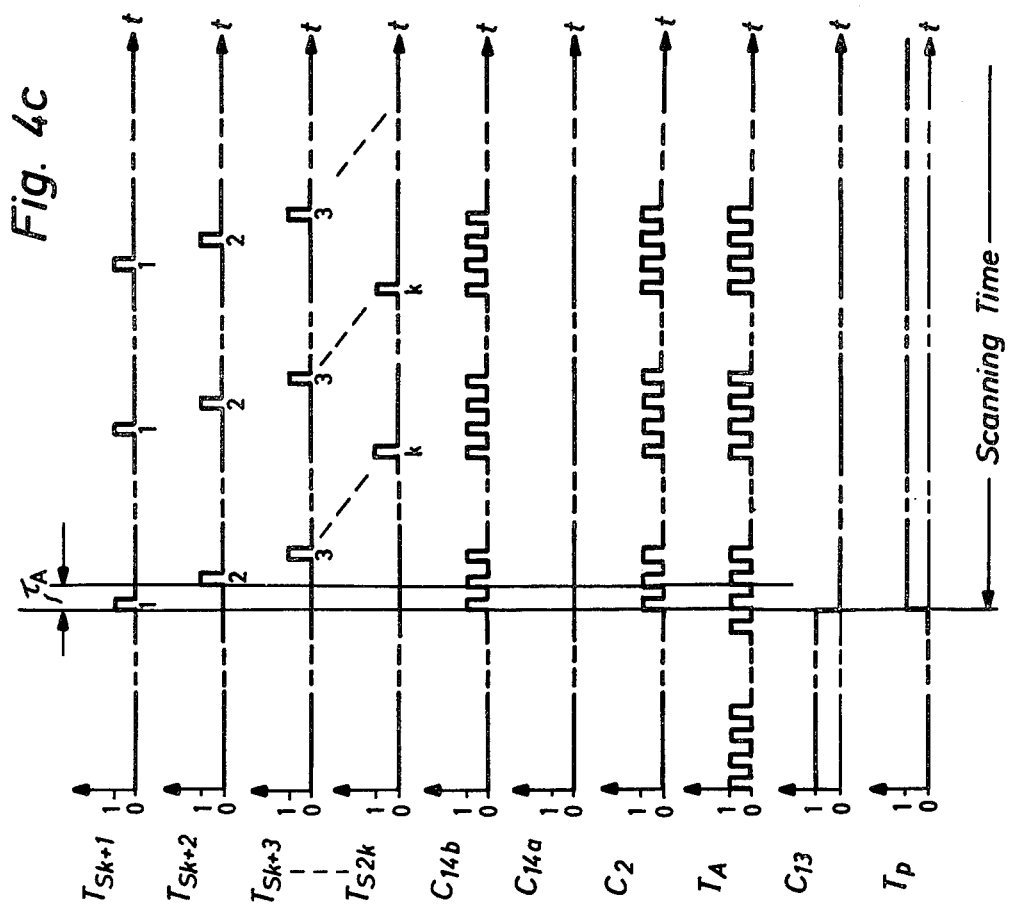
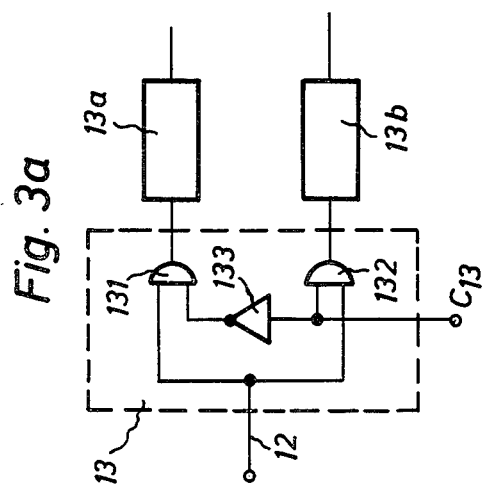
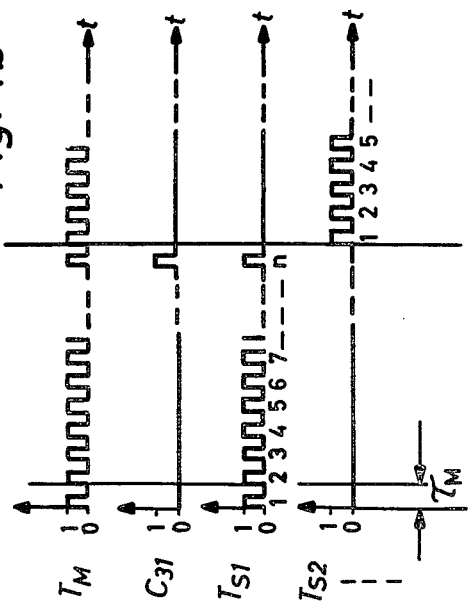

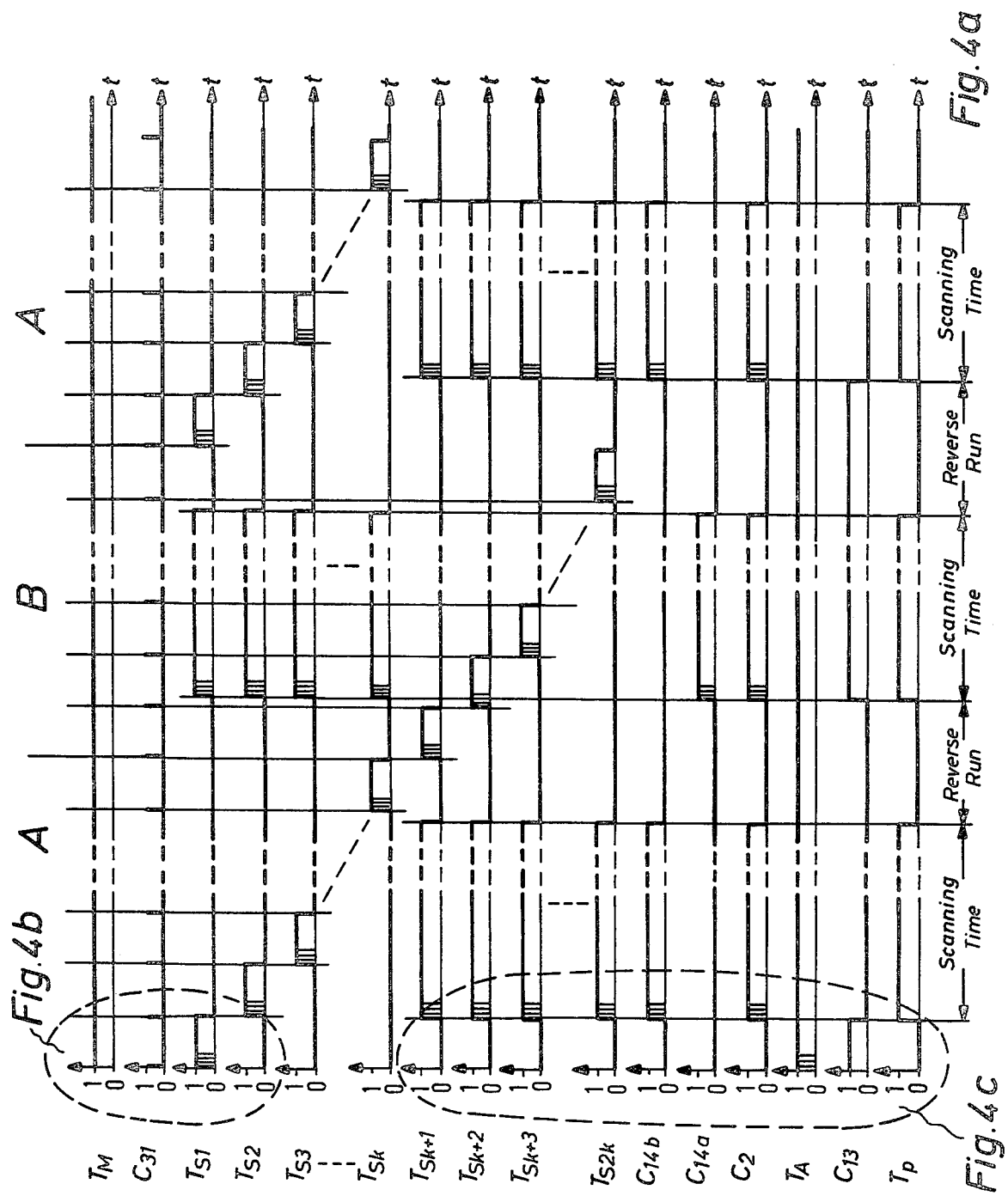

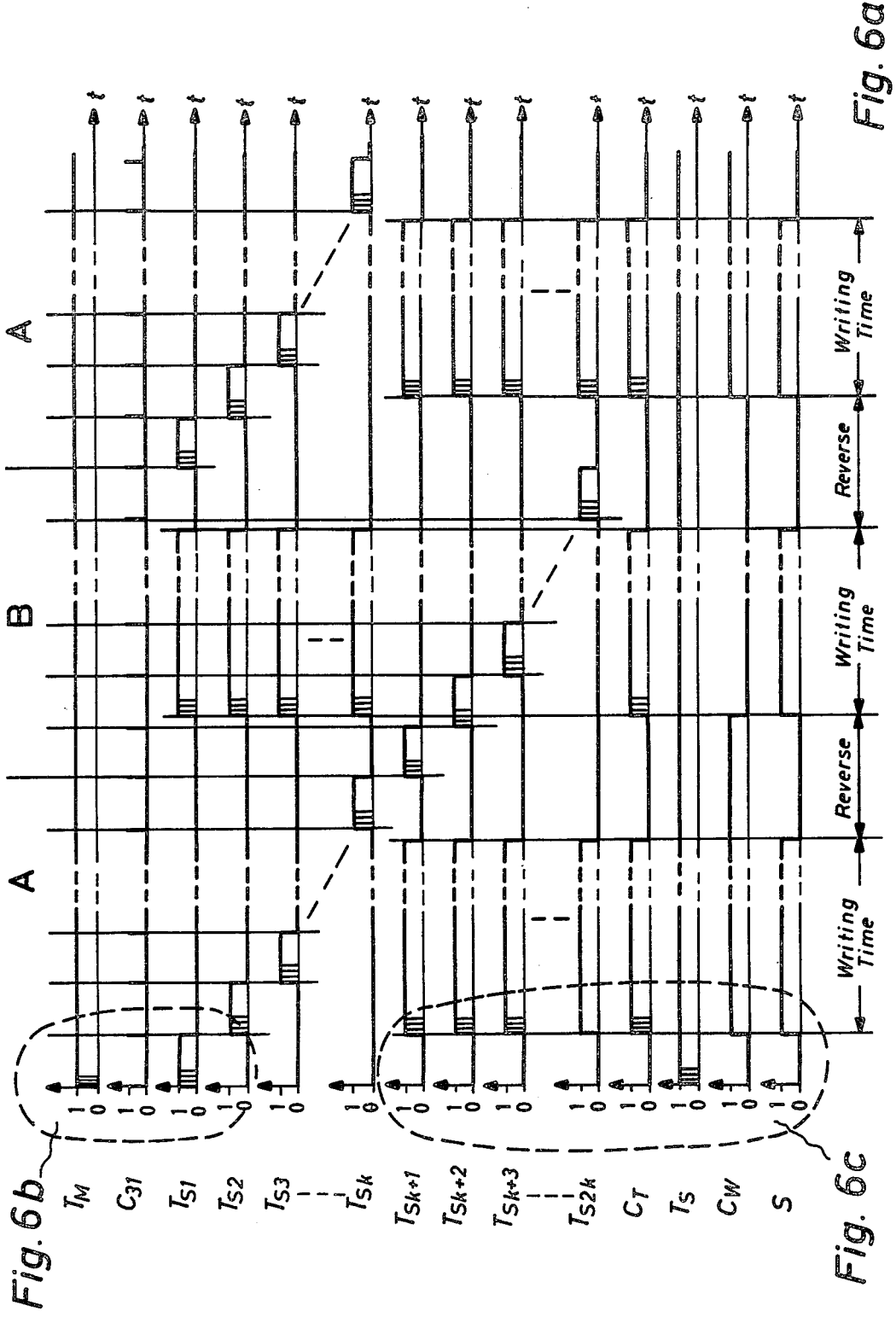

METHOD AND APPARATUS FOR ELECTRO-OPTICALLY SENSING, TRANSMITTING AND RECORDING PICTORIAL INFORMATION IN PARTICULAR FACSIMILE TRANSMISSION SYSTEMS

This is a division, of application Ser. No. 803,143, filed June 3, 1977, which is a continuation-in-part of Ser. No. 679,087, filed Apr. 21, 1976, now abandoned.

BACKGROUND OF THE INVENTION

1. Field of the Invention

This invention relates to a method and apparatus for electro-optically sensing transmitting and rerecording picture patterns, as for example, in a facsimile system wherein the picture pattern is scanned in a step-by-step manner with a plurality of lines being simultaneously scanned with a multihead scanning device and wherein the output information from the scanning head is converted from parallel information into series information.

2. Description of the Prior Art

German Pat. published application No. 2,231,650 describes an arrangement relative to its FIG. 2 which illustrates a sensing device with several electro-optical converters arranged in a row which sense a scene which is to be observed in several parallel lines. Parallel sensing is used in this patent publication to combine the signals of adjacent channels so as to improve the modulation-transfer function transverse to the sensing direction. In military operations this will result in individual objects being better recognized at greater distances.

German published patent application No. 2,351,986 describes a circuit arrangement for a recording device including a discrete switch with a plurality of electro-optical converter elements which uses a special circuit for improving the picture information which is being sensed.

The magazine entitled "Elektronik-Information", Volume 9 of Sept. 9, 1973 at pages 50–56 describes a "A Self-Sensing Photo-Diode Line" written by Heinz Friedberg. The individual diodes in this article are connected to a shift register which during the sensing process supplies a succession of picture signals at its output which have been sensed by the individual diodes in accordance with the picture dots one after the other. Such an arrangement is well suited for electro-optically sensing of patterns.

The following German published patent applications and art serve as background for the present invention:
 DT-OS No. 2,231,650
 DT-OS No. 2,351,986
 DT-OS No. 2,219,442
 DT-OS No. 1,903,964
 DT-OS No. 2,354,520
 DT-OS No. 1,762,090
 DT-OS No. 1,908,834
 DT-Auslegeschrift No. 2,034,350
 U.S. Letters Patent No. 3,814,846
 "Electronic Information", Sept. 9, 1973, 5th Volume, Pages 50–56

SUMMARY OF THE INVENTION

If a sensing device having a sensing head with a plurality of electro-optical elements is moved back and forth over a pattern as, for example, in a facsimile system, a succession of picture signals will appear as sensing signals which relate to different lines one after the other. Since, however, the transmission of the picture signals in the facsimile system is effected such that only line sequence signals are transmitted and such signals are recorded line by line and image dot by image dot at the recording site, the signals obtained by multiple head scanning arrangements are not suited for this purpose. The reason for line sequence transmission or sending of the picture signals is because there are world-wide standards requiring that all recording devices which are connected to a transmitter may operate compatible with each other. This requires that the sensing devices being used match the patterns exactly line by line with an individual photo-electric sensing arrangement which will automatically assure and provide a line sequence signal. Since, however, only one line is sensed at a time such a sensing system is very slow in its sensing speed which also means that it requires a substantial length of time to transmit a picture between a transmitter and receiving station.

It is very desirable, however, to transmit pictures in shorter times and it is, therefore, an object of the present invention to reduce the time required for sensing a picture to be transmitted and recording such picture at a receiving site.

The present invention has an object to provide a simple and quick method and apparatus for sensing, transmitting and recording picture patterns which can be used with commonly available transmission techniques for facsimile transmission.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 3a is an example for the switch 13 of FIG. 3,

FIGS. 4a, 4b and 4c illustrate the timing wave patterns for synchronizing the circuit of FIG. 3;

FIGS. 6a, 6b and 6c illustrate timing waves for the receiver of FIG. 5;

DESCRIPTION OF THE PREFERRED EMBODIMENTS

Figure 1:
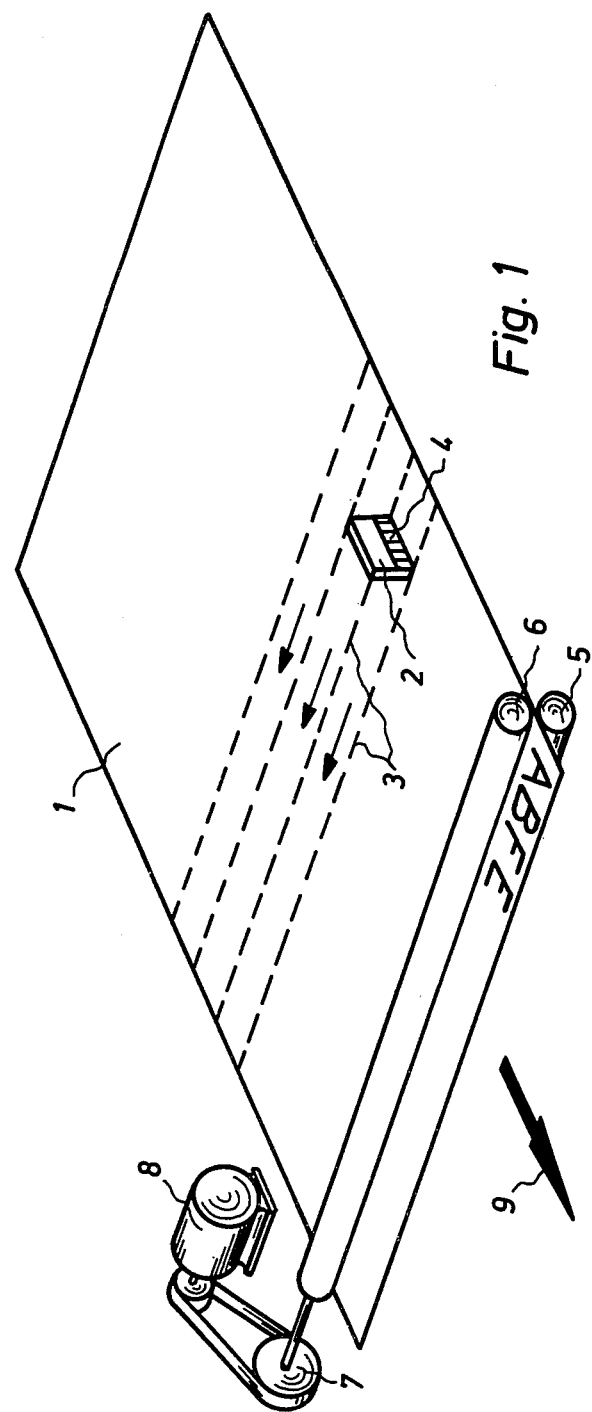
FIG. 1 is a perspective view illustrating a plural scanning head.

FIG. 1 illustrates a flat bed sensor so as to simplify and clarify the sensing principle of the present invention.

A pattern to be scanned 1 is scanned by a sensing head 2 which includes a plurality of electro-optical converters such as photo-diodes 4 mounted side-to-side in the head 2 and which are scanned across the picture 1 between the dashed lines 3 such that each time the head 2 passes across the sheet 1 an area between adjacent dashed lines 3 is scanned. For clarity, the device for driving and moving the sensing head 2 is not illustrated. Such drive means are well known in the art. Because the head 2 has a plurality of electro-optical converters or photo-diodes 4 the head 2 may be scanned back and forth across the paper much slower than a head which carries a single photo-electric converter since a larger area is scanned by the head of the invention than with a single electro-optical converter of the prior art. After the head 2 scans across the area defined by the dashed lines 3 the picture 1 is advanced by a motor 8 which drives a pulley 7 that drives the rollers 5 and 6 to advance the picture in a step fashion in the direction of the arrow 9. The head 2 continues to scan after each advancement of the picture 1 until the complete area of the picture has been scanned.

Figure 2:
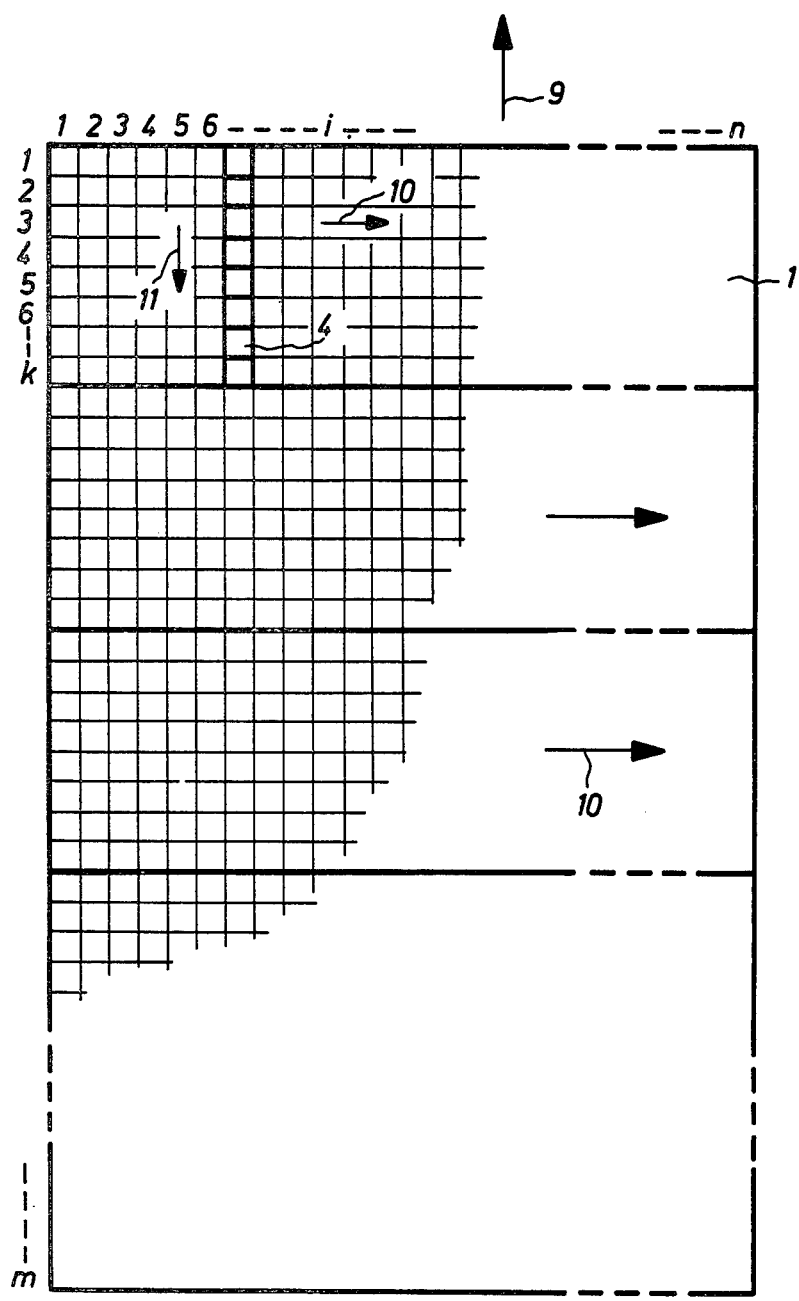
FIG. 2 is a plan view of a picture being scanned to show the incremental elements and the sensing raster.

FIG. 2 is a plan view of the picture to be scanned and illustrates the picture 1 and the sensing head 2 with its plurality of electro-optical elements 4 which is moved in the direction of the arrow 10 across the picture 1 and the picture is advanced in the direction of the arrow 9 as in FIG. 1.

The picture 1 is subdivided into 1, 2, 3, 4 ... i ... n columns and into 1, 2, 3 ... k ... m lines. In the example of FIG. 2, the sensing head has eight electro-optical sensors 4 and, thus, the sensing head scans a total of eight lines simultaneously. Thus, one picture dot which is to be sensed is defined by the intersection of two columns and two lines which define four intersections. The row 4 of the plural photo-diode head is interrogated in the direction of arrow 11 or in the opposite direction 9 with a timing which is a multiple faster than the advancing movement of the sensing head so that the picture signals of a column will appear one after another at the output of the sensing head which, however, belong to different lines in succession.

Figure 3:
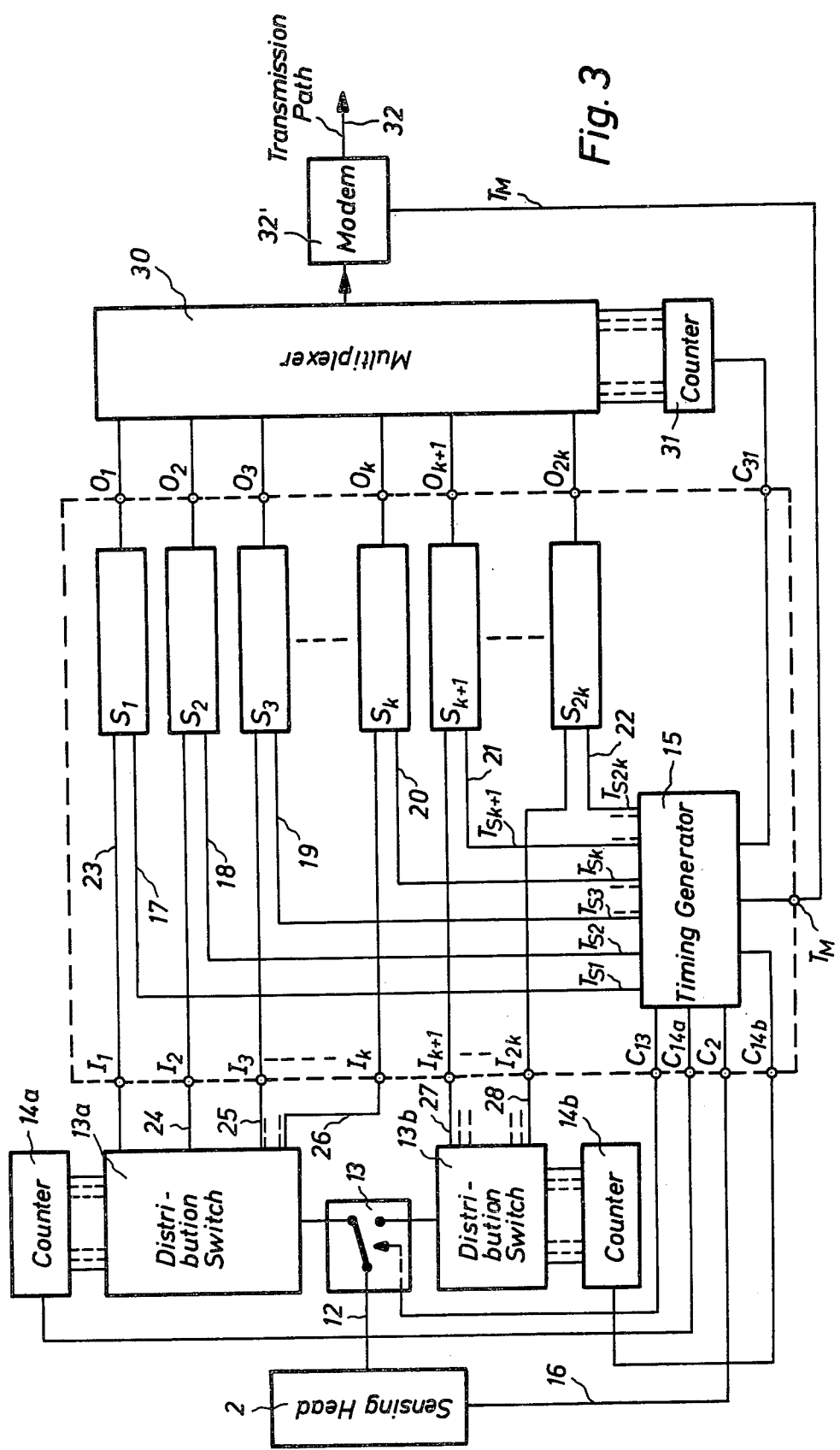
FIG. 3 is a block diagram illustrating a circuit arrangement for the invention.

FIG. 3 is a block diagram illustrating how the signals obtained by the multiple electro-optical sensing head 2 are converted into line sequence signals. The sensing head 2 may, for instance, have k diodes as is described in the magazine "Elektronik Information", Sept. 9, 1973, 5th Volume, at pages 50-56. Such picture signals are arranged in accordance with the columns shown in FIG. 2, and are supplied to a switch 13 through a line 12 from where they are distributed to distribution switches 13a or 13b which are controlled by the counters 14a and 14b, respectively.

Figure 3B:
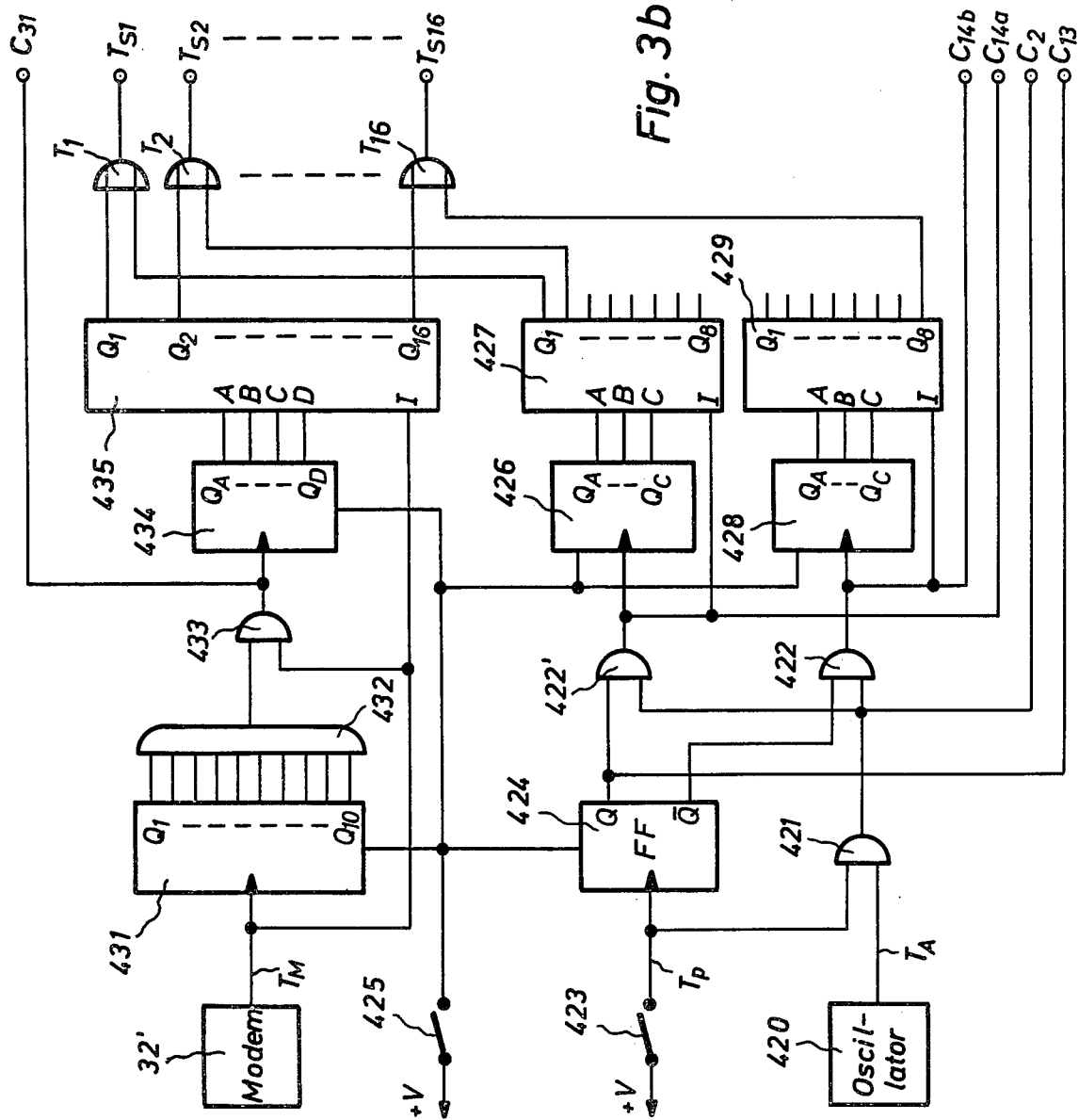
FIG. 3b is a circuit diagram for the timing generator of FIG. 3.

Both of the counters 14a and 14b as well as the sensing head 2 receive outputs from a timing generator 15 which is described in detail in FIG. 3b so as to cause the sensing head to move and to drive the counters 14a and 14b. The timing impulses from the generator 15 via line 16 is called the synchronizing signals. The synchronizing signals determine the speed at which the output picture signals are obtained one picture signal after another from a shift register. The shift register the output of a single photo diode and produces a line of information. The information from the sensing head 2 is separated by the distribution switches 13a and 13b into information corresponding to individual lines from the picture and are then supplied to a plurality of line shift registers $S_1$ through $S_{2k}$. The number of shift registers corresponds to two times the number of individual photo diodes in the scanning head 2. The shift register to be used may be type MM 5058 from National Semiconductor.

A detailed description of the switch 13 is provided in FIG. 3a. The line 12 is connected to two AND-gates 131 and 132. The second input of the AND-gate 132 is connected to a circuit point C13 which receives switching pulses from the pulse generator 15. The second input of the AND-gate 131 is connected to point C13 via an inverter 133. The AND-gates 131 and 132 become alternately conductive in response to the signal originating from the pulse generator 15, i.e. the signals from the scanning device 2 are alternately passed on to the distributor circuits 13a and 13b. These distributor switches 13a and 13b may be switches of the type SN 74 LS 138 by Texas Instruments, and the counters 14a and 14b may be of the type SN 74163 by Texas Instruments. Multi-level counters are obtained when utilizing the generally known technique of cascading.

The output of the timing generator 15 is supplied by leads 17, through 22 to the shift registers $S_1$ through $S_{2k}$ as shown. At a particular time, the picture signal arriving at line 12 will be processed to the first shift register $S_1$ under control of the counter 14a through the distribution switch 13a and line 23. During the next sensing sequence, the distribution switch 13a switches the picture signal arriving at line 12 onto line 24 which will store this signal in the shift register $S_2$ which corresponds to the second line. This process continues until the last diode k of the diode line of the sensing head 2 has been interrogated and the picture signal of the k diode will be stored in shift register $S_k$.

During the next sensing sequence, a shift impulse is sent from the timing generator 15 to the shift register $S_1$ and simultaneously however, the counter 14a has again switched the distribution switch 13a to line 23 and, thus, the signal emitted by the first diode will be supplied to the shift register $S_1$ whose first stage will have been cleared by the shift impulse. During the next impulse, the first position of the shift register $S_2$ is cleared and the switch 13a is connected to line 24 so that the picture signal of the second diode is supplied to the shift register $S_2$. This process repeats until a complete line length has been scanned by the sensing head 2 and the shift registers $S_1$ and $S_k$ are filled.

An end of line impulse causes switch 13 to change and moves it so that the output of the sensing head supplied through line 12 is supplied to the distributing switches 13b rather than to distributing switch 13a. The distributing switches 13b are connected to the shift registers $S_{k+1}$ through $S_{2k}$. It is to be realized that the same number of shift registers are connected to the distributing switch 13b as are connected to the distributing switches 13a. After the pattern 1 has been shifted by the motor 8 for a length corresponding to the distance between the dashed lines 3 and the scanning head 2 has been returned to the first edge of the paper, the sensing of a new line will commence. The first sensing impulse switches the distribution switch 13b to the shift register $S_{k+1}$ under control of the counter 14b and it receives a first picture signal from the first diode of the diode line. During the second sensing impulse, the switch 13b will switch the output to the next shift register $S_{k+2}$ which will obtain the picture signal from the second diode.

This process continues until the shift registers $S_{k+1}$ through $S_{2k}$ are filled and synchronizing signal will reach the timing inputs 21 and 22 which will clear the first stages for the following picture signals.

However when the new line multiple is sensed, the shift register $S_1$ is supplied the interrogation synchronizing signal by the timing generator through line 17 and since it is already filled it will start reading out its information to a multiplexer 30. Such multiplexers are available from Texas Instruments, Type SN 74150. All of the shift registers $S_1$ through $S_{2k}$ are connected to the multiplexer 30 which also receives an input from a counter 31 which receives the synchronizing signal from the timing generator 15. The counter 31 may be of the type SN 7493, SN 74393 or any other available counter of Texas Instruments. The line synchronizing signal is composed of the successive line end signals and can be produced in a simple manner during the sensing process by a contact or a light barrier which is engaged when the sensing head 2 has reached the end of a line. The multiplexer 30 processes the signals and supplies them to a transmission line 32. If the shift register $S_1$ is counted until it is emptied, the multiplexer 30 controlled by the counter 31 will shift the shift register $S_2$ to the transmission line 32 and this process will continue until the shift registers $S_1$ through $S_k$ have been emptied. The supplying of the information from the shift registers $S_1$ through $S_k$ through the multiplexer to the transmission line 32 occurs while incoming signals from the sensing head 2 are supplied through the distributing switches 13b to the shift registers $S_{k+1}$ through $S_{2k}$ so one-half of the shift registers are receiving information from the sensing head 2 while information is being read from the other half of the shift registers which information was stored during the previous scanning cycle. Thus, in the invention, the output of the sensing head is supplied to a first group of shift registers which equal the number of sensing elements in the head 2 during a first time sequence after which the input from the sensing head is switched to a second group of shift registers which also equal the number of sensing elements in the sensing head and during such second period the information stored in the first group of shift registers is furnished to the multiplexer 30 and transmitted to a modem 32' which is arranged between the multiplexer 30 and the transmission path.

Modems of this kind are used at the beginning and at the end of a transmission path in facsimile and data transmission, and merely take care of a constant data flow and an adjustment to the transmission speed. Such modems are available and standardized. In the present case, for example, a modem of the firm Codex, Type Codex 4800 can be utilized which transmits with a constant bitrate of, for example, 4800 bit/sec. In order to achieve a transmission with the aid of such a modem, an adjustment of the transmission and receiver device to the transmission rate, i.e. to the modem pulse, is required. This modem, in principle, has nothing to do with the present invention, however, it is mentioned in order to completely describe the transmission path.

FIG. 3b illustrates the pulse generator 15 of FIG. 3 more closely. The example of FIG. 3b illustrates the case where K=8, i.e. 8 photo-elements are combined in the scanning device. In accordance therewith 2×8 shift registers are also provided in FIG. 3. The scanning apparatus has a pulse oscillator 420 providing the so-called machine pulse $T_A$ illustrated in detail in the FIGS. 4a and 4c. This is the pulse which causes the scanning to be carried out and from which the other pulses are derived which are more closely described in the following. The pulse frequency of this pulse may lie, for example, at about 250 kHz to 500 kHz. A module of a type K 1100 A, the crystal-oscillator from Motorola can be utilized as the generator. This oscillator provides quartz-stabilized pulses.

A different suitable pulse generator, of course, can also be used.

An AND-gate 421 is connected at the outlet side of the generator 420, said gate is controlled by a contact 423 or a light barrier signaling the line begin or line end during the scanning. These impulses are led from the position of the scanning device in a known manner at the respective line begin or line end, and as many pulses are cut out of the pulse sequence provided by the generator 420, referenced with $T_A$ in FIG. 4a, via the AND-gate 421, as the length of a scanning line. In the present case, the number of pulses is 1024, which is illustrated in FIG. 4a and FIG. 4c by the pulse train $C_2$ or by the path $T_p$, respectively. This output impulse row of the AND-gate 421 goes to two additional AND-gates 422 and 422' which, together with a flip-flop 424 represent a switch. The flip-flop 424 may have been set to 0 before beginning the scanning by, for example, a switch 425 present in the apparatus (general reset). The flip-flop is set at the line begin by means of the line switch 423, i.e. its Q-outlet may be one, its $\overline{Q}$-outlet may be 0. The impulse row $C_2$ reaches the AND-gate 422' with the through-connecting of the AND-gate 421, said AND-gate 422' connects through and triggers the counter 426 which is a 3-bit-binary counter. This counter was also previously set to 0 (general reset) by means of the switch 425. The output of the AND-gate 422', moreover, is connected with the impulse information input 1 of a 3 to 8-demultiplexer 427 which is triggered by the counter 426. With each pulse coming from the AND-gate 422', the counter 426 transfers the multiplexer 427 to one of the outlets Q1 through Q8. The outlets Q1 through Q8 of the demultiplexer 427 are connected with OR-gates $T_1$ through $T_{16}$, whose outlets form the write pulse lines $T_{S1}$, $T_{S2}$ through $T_{S16}$, which represent the lines going from the pulse generator 15 to the shift registers $S_1$ through $S_{2k}$ ($S_1$ through $S_{16}$) in FIG. 3.

In order to clarity the read-in process from the scanning device into the write register, the pulse diagrams of FIG. 4a through FIG. 4c are used in conjunction with the FIGS. 3 and 3b. As stated, a set of shift registers $S_1$ through $S_k$ should be loaded while the other set is read out, and vice-versa. The alternating writing into the shift register is accomplished with the switch 13 with the aid of the shift pulses $C_{13}$ of FIG. 4a and FIG. 4c originating from the flip-flop 424 and the switch 423. The information at switch 13 reaches the distributor switches 13a and 13b which are multiplexers, which are controlled by the counters 14a and 14b. The counters receive their counter pulses via the outlets $C_{14a}$ and $C_{14b}$ of the generator 15 originating from the AND-gates 422 and 423 of the circuit in FIG. 3b, and such pulses are illustrated as impulse sequences in FIG. 4a. The individual pulses are drawn in FIG. 4c in an enlarged scale.

FIG. 4c illustrates in the upper portion the write impulses $T_{Sk+1}$ through $T_{S2k}$ for the case when the second block of shift registers is being loaded. In that case the gate 422 is opened, the pulse sequence $C_2$ equals $C_{14b}$ which reach the counter 428 controlling the distribution of the output impulses of gate 428 pulse sequence 14b, the pulse lines $T_{Sk+1}$ through $T_{2Sk}$, i.e. $T_{S9}$ through $T_{S16}$, whereby the information arriving via the output lines $I_{k+1}$ through $I_{2k}$ of the distributor switch 13b are distributed to the shift registers $S_{k+1}$ through $S_{2k}$.

The registers $S_1$ through $S_k$ are to be read out simultaneously. The modem pulses $T_M$ originating from the modem 32, which are illustrated in FIG. 4a and FIG. 4b are supplied to a 10-bit counter 431 which is connected with a multiple AND-gate 432 and gives out an impulse after 10-bits, i.e. after 1024 impulses. The modem pulse occurs at a 4800 Hz rate corresponding with a bit-rate of 4800 bit/sec.

The modem pulse $T_M$ additionally reaches an AND-gate 433 connected at the outlet side of the gate 432, and said AND-gate 433 triggers a 4 bit-binary counter 434 which triggers a 4 to 16 multiplexer 435. The counters 431 and 434 may have been set to 0 before the scanning begin by a general reset signal. If the modem starts the picture signal transmission then the modem pulse $T_M$ begins and reaches the output $Q_1$ of the demultiplexer 435 and thus the OR-gate $T_1$ via the information input of the demultiplexer 435, and thus reaches as a write pulse the shift register $S_1$ which is connected to the modem 32 via the multiplexer 30 of FIG. 3. The multiplexer 30 is controlled by the counter 31, and is again loaded by the pulse $C_{31}$ which is at the inlet $Q_1$, thus and, the shift register $S_1$ is connected to the modem.

If a line-length of the modem pulse occurs, i.e. gate 432 gives off an output impulse, and the shift register $S_1$ is empty, the AND-gate 432 is opened by means of the next modem pulse, the counter 434 increases by one, the information input I of the demultiplexer is applied to the outlet $Q_2$, and a timing pulse appears on line $C_{31}$ which applies the $Q_2$ input of the multiplexer 30 to the modem 32' via the counter 31. Thus, the shift impulse series for the readout of the shift register $S_2$ passes out through the OR-gate $T_2$, i.e. the shift register $S_2$ is emptied. This process goes on until the shift register $S_{16}$ is empty.

However, the switch 13 has switched in the meantime, whereby again an information input resulted from the scanner during the readout of the last shift register of the first shift register, which was initially described. The shift pulses for the readout, and the switch pulse for the counters 434 and 31 are illustrated in FIG. 4b. Thus, the pulse $C_{31}$ is a line-end pulse which is for derived switching the shift registers.

Figure 5:
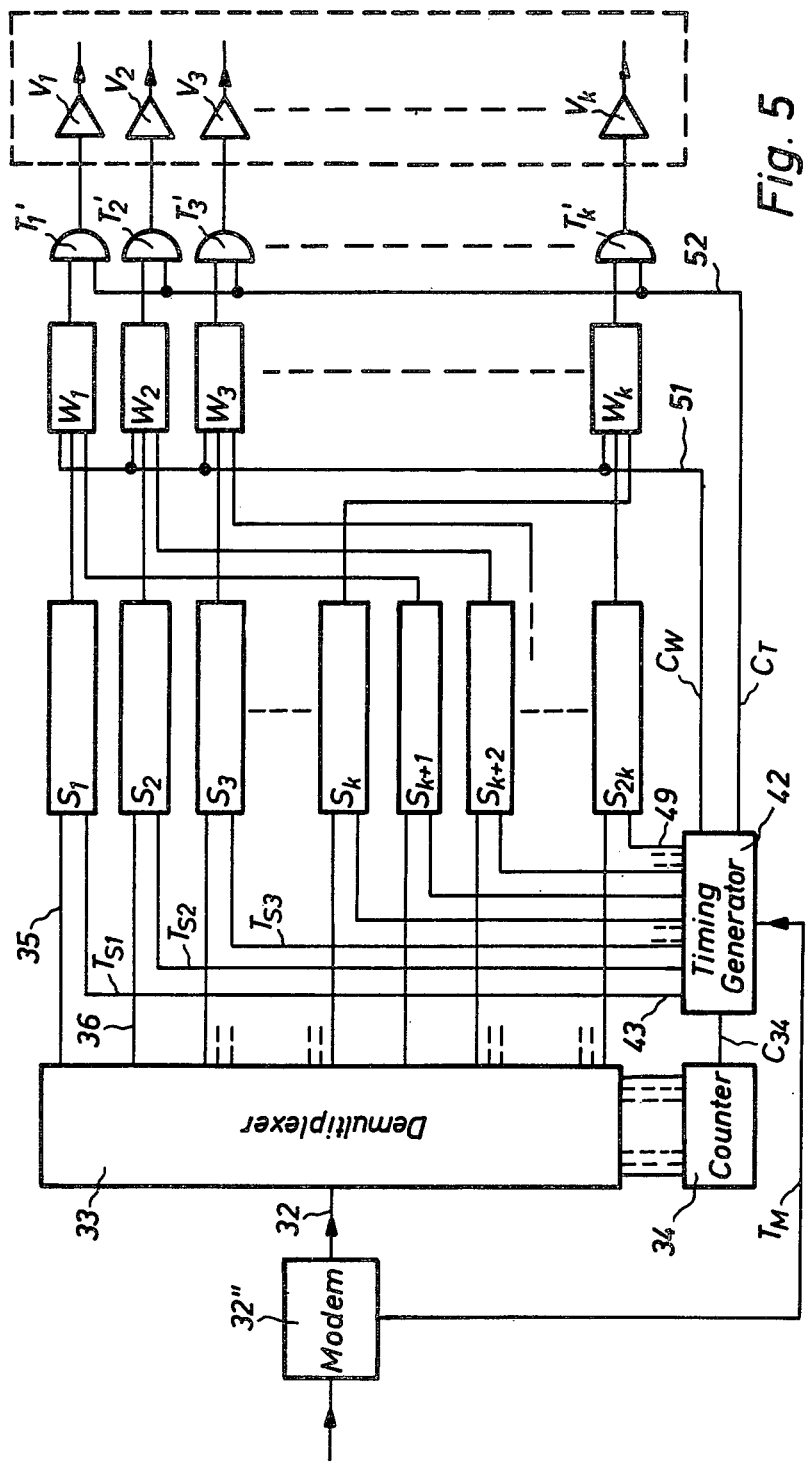
FIG. 5 is a block diagram of a receiver of the invention.

The following available components can be used for individual assemblies in the circuit of FIG. 5 or 5b, respectively:

Demultiplexer 33: Texas Instruments Ser. No 74154
Counter 34: Texas Instruments Ser. No. 74163
Shift Registers $S_1$ through $S_{2k}$: National Semiconductor
Separators W1 through Wk: In each case one quarter of the module Ser. No. 74156 by Texas Instruments FIG. 5 illustrates a receiver according to the principles of the invention in which the line sequence picture signals arrive over a transmission path which can then be recorded with a multiple parallel writing head that is connected to the output of writing amplifiers $V_1$ through $V_k$. It is to be realized, of course, the transmission of the signals between the transmitting and receiving station need not be made by cable or wire lines but could also be accomplished by radio transmission if desired.

The demultiplexer 33 receives the incoming signal over a modem 32" and is controlled by a counter 34 which receives an input from the timing generator 42. The demultiplexer 33 supplies the arriving picture signals of the first line through conductor 35 to a first shift register $S_1$ which is designed to receive the signals of a complete line. When the register $S_1$ is filled, the second register $S_2$ receives the output of the demultiplexer 33 through line 36 which is connected to the input line 32 by the demultiplexer. This continues until all of the registers $S_1$ through $S_k$ are filled and there are twice as many registers as there are parallel writing heads. It will be assumed in this example that there are the same number of writing heads k as there are diode sensing elements of the sensing head.

After the first set of line shift registers $S_1$ through $S_k$ have been filled, the output of the demultiplexer 33 is connected to the shift registers $S_{k+1}$ through $S_{2k}$ which are then filled line by line. The timing sequence for advancing the shifting of the picture signals of the shift registers are supplied from the timing generator 42 through lines 43 through 49 into the timing inputs of the shift registers S. It is advantageous if the timing base at which the picture signals arrive via line 32 are used as the shift timing base. As the shift registers $S_{k+1}$ through $S_{2k}$ are being filled the shift registers $S_1$ through $S_k$ can be read out in parallel and this is effected by way of switches $W_1$ through $W_k$ each of which are respectively connected to the shift registers and which supply the picture signals read out from the registers to the writing amplifiers $V_1$ through $V_k$ of the multiple parallel writing heads through gates $T_1'$ through $T_k'$. The switch $W_1$ has one of its input connected to the register $S_1$ and its other input connected to the register $S_{k+1}$. If the register $S_{k+1}$ is filled, the switch $W_1$ connects the register $S_1$ to the gate $T_1$. In the other situation the register $S_{k+1}$ is connected to the gate $T_1$ while the register $S_1$ is being filled. In the same manner, the other shift registers are connected to the writing head through switches $W_2$ through $W_k$ so that the alternate read-into and read-out of the picture signal into the shift registers is accomplished. The switching of the switches from one set of shift registers $S_1$ through $S_k$ to the other set of shift registers $S_{k+1}$ through $S_{2k}$ is accomplished by line 51 which receives an output of the timing generator 42 which supplies a switching impulse when the two shift register groups $S_1$ through $S_k$ and $S_{k+1}$ through $S_{2k}$ are respectively being filled or emptied. The gates $T_1$ through $T_{2k}$ assure that the exact beginning of the recordation can be determined by way of the timing starting line 52 which is connected to the output of the timing generator 42.

Figure 5A:
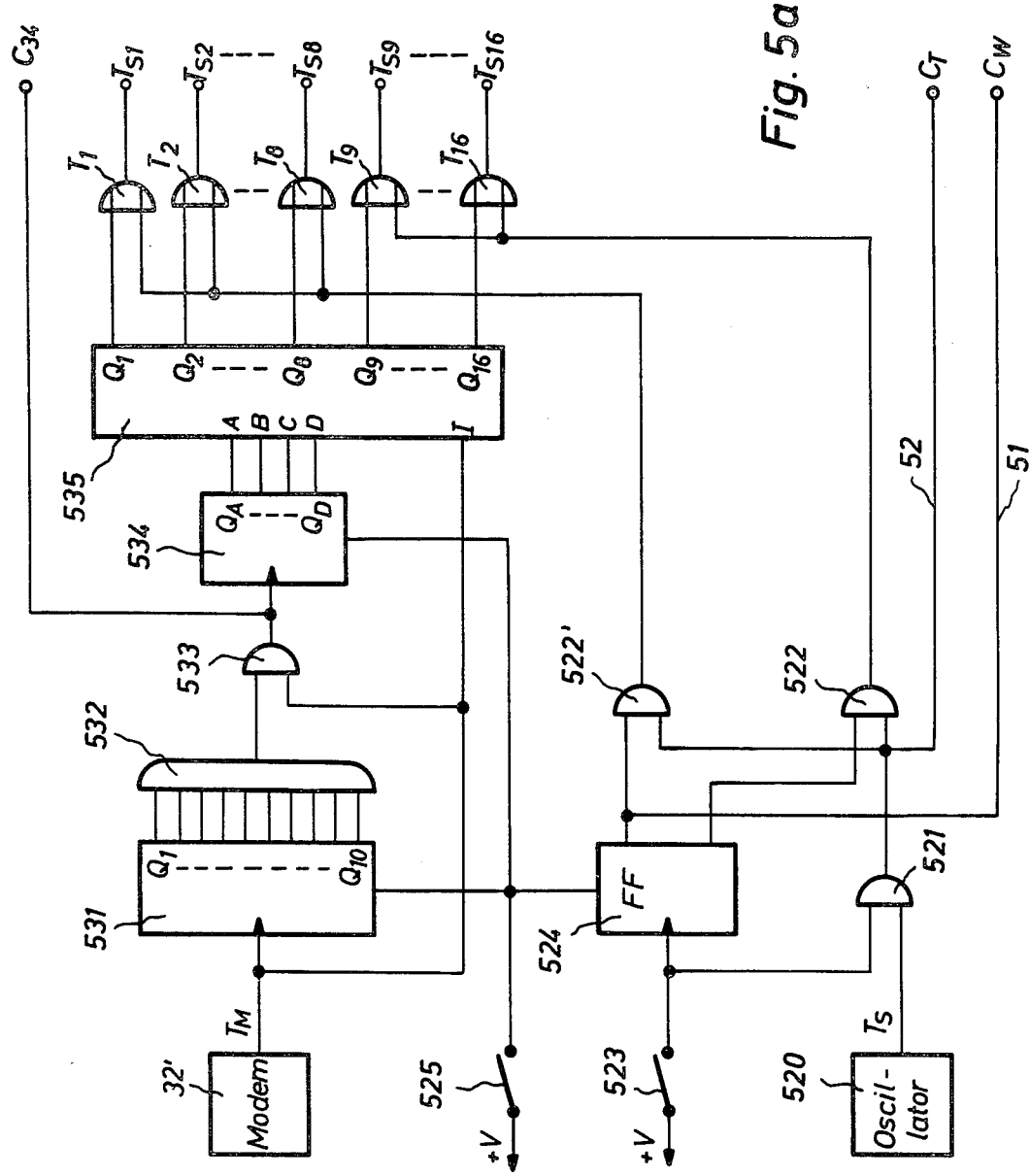
FIG. 5a is a circuit diagram of the timing generator of FIG. 5.

The pulse generator 42 is illustrated in more detail in FIG. 5a. A pulse oscillator 520 is mounted in the receiver apparatus has the same purpose and mode of operation as the generator 420 of FIG. 3b. The same module as in FIG. 3b can be used. It provides the write pulse $T_S$ which triggers the recording devices $V_1$ through $V_K$. A line switch 523 is provided along with the pulse generator 520, and such line switch controls a flip flop 524 and an AND-gate 521 as in FIG. 3b. Two AND-gates 522 and 522' are connected at the outlet side of the flip-flop 524, as in FIG. 3b. These two AND-gates switch the shift pulses to the two shift register blocks $S_1$ through $S_8$, or $S_9$ through $S_{16}$, respectively.

A positive voltage is applied to the flip-flop 524, which is set to 0 by means of the switch 525 (general reset) before the beginning of the transmission, by means of the line switch 523. Its Q-outlet has the value of 0 and its $\bar{Q}$-transverse outlet has the value of 1. As long as the gate 521 is open, i.e. during the length of a line multiple, the AND-gate 522 is also open. Its outlet pulse $T_S$ appears at the OR-gates $T_9$ through $T_{16}$. At the end of the first line multiple the switch 523 cuts off the positive voltage, and the flip-flop 524 is set by means of the negative flank. The value of 1 is then at the Q-outlet, and the value of 0 is at the $\overline{Q}$-transverse outlet. These make the gate 522' open, i.e. the signals are switched from gate 522 to gate 522', the and pulses $T_S$ go to the OR-gates $T_1$ through $T_8$.

Impulses $C_W$ furthermore reach alternatingly the separators $W_1$ through $W_K$. Also impulse row $C_T$ reaches the AND-gates $T'_1$ through $T'_K$ with each switching of the flip-flop 524.

The control for the distribution of informations received from the line via the modem 32" to the shaft registers $S_1$ through $S_{2K}$ is provided in the upper portion of FIG 5a. As soon as the picture transmission starts, the modem 32" produces the modem pulse $T_M$ corresponding to the pulse of the modem the the transmitter. The modem pulse goes to a 10-bit-binary counter 531 which has at its output a multiple-AND-gate 532 which also becomes opened in the case a 1 is present at the outputs of the counter 531. This also occurs when the number of image points representing a line length, is obtained. In the first line the modem pulse lies directly above the information input I of the demultiplexer 535 at the output $Q_1$ of the demultiplexer. The pulse sequence goes to the shift register $S_1$ as shift pulse sequence $T_{S1}$ via the output $Q_1$ and the OR-gate $T_1$. The demultiplexer 33 has a counter 34 as shown in FIG. 5 and is constructed exactly the same as the demultiplexer 535 and the counter 534 of FIG. 5a The information coming from the modem also goes to the outlet $Q_1$ of the demultiplexer 33, and thus to line 35 via the information inlet 1, not illustrated in FIG. 5, which leads to the shift register $S_1$.

After read-in of the input of the first line into the shift register $S_1$, the AND-gate 533 receives an impulse from the multiple AND-gate 532 and becomes conducting, whereby the 4-bit-binary counter 534 switches the demultiplexer 535 from its outlet $Q_1$ to the outlet $Q_2$. The same process occurs in the demultiplexer 33, controlled by the counter 34, which also receives this count impulse $C_{34}$ from the output of the AND-gate 533. Thus, the information of the individual lines, controlled by means of the output impulses of the AND-gate 533, is distributed to the shift registers $S_1$ through $S_{2k}$, i.e. through $S_{16}$.

While the shift register groups $S_1$ through $S_8$ were being filled, the shift register groups $S_9$ of $S_{16}$ remains connected with the machine pulse $T_S$ via the OR-gates $T_9$ through $T_{16}$ and the AND-gate 522 which causes read-out of the shift registers $S_9$ through $S_{16}$ via the separators $W_9$ through $W_{16}$. The pulse $C_T$ is tapped from the input of the AND-gate 522, and this pulse is guided to the AND-gates $T'_1$ through $T'_k$ in order to effect the parallel connection-on of the signals; arriving via the separators, to the recording amplifiers $V_1$ through $V_k$.

Since the shift registers $S_9$ through $S_{16}$ do not contain any information at the beginning of the transmission, the writing head device would in this case record an empty line. However, this can be prevented by producing the switching inpulse formed by the switch 523, for the flip-flop 524, in a different manner, and the writing motion of the scanning device is suppressed during the transmission of the first line multiple. The obtaining of the switching impulse for the flip-flop 524 can be attained in a simple manner by means of a counter, not illustrated from the pulse $T_M$, or by means of counting the impulses at the outlet $Q_8$ of the demultiplexer 535, if a corresponding impulse is produced with the last shift pulse of the shift register $S_8$.

The flip-flop 524 is switched by means of the impulse at the end of the first line multiple, the gate 522' becomes conductive, and thus the OR-gates $T_1$ through $T_8$. This causes the pulse sequence $C_T$ to reache through the OR-gates $T_1$ through $T_8$, to the shift registers $S_1$ through $S_8$, and this effects a further shifting of the previous input information via the separators $W_1$ through $W_8$, and the gates $T_1'$ through $T_8'$. The separators are switched by means of the switching impulse $C_W$ which was produced during the switching of the flip-flop 524. With each successive impulse, derived from the switch 523 at the end of the line multiple, this process repeats so that the simultaneous read-in and read-out from the shift register groups $S_1$ through $S_8$, and $S_9$ through $S_{16}$ is alternately switched.

Figure 6C:
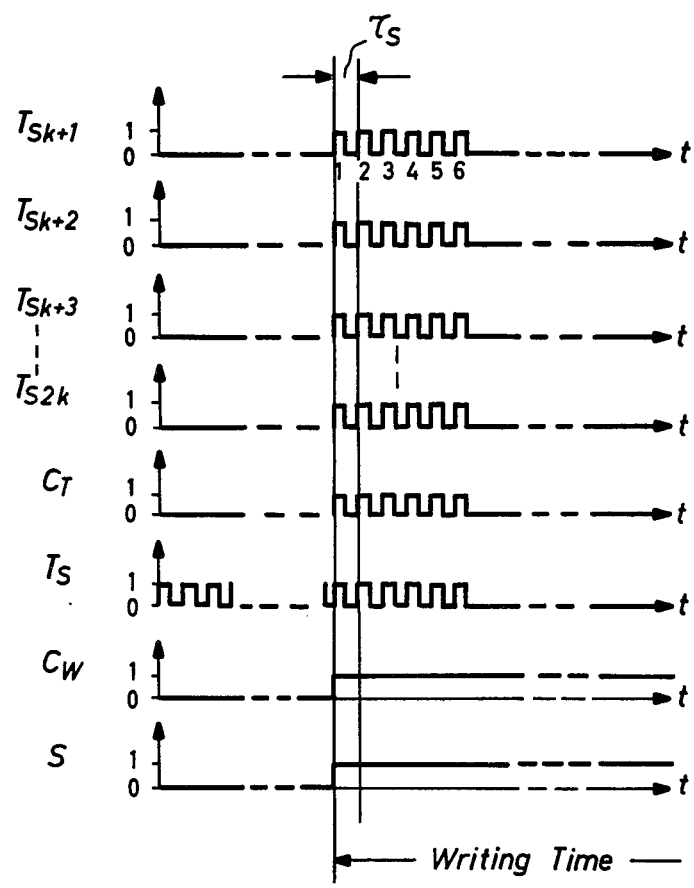
Figure 6B:
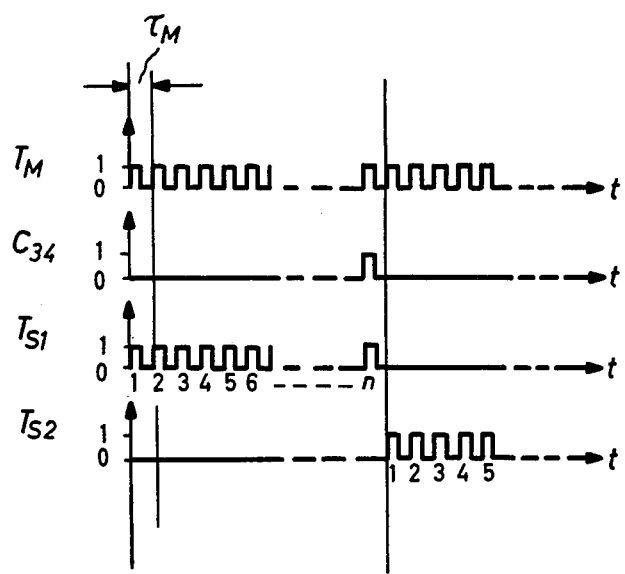

In the circuit in accordance with FIG. 5b the following modules available on the market can be used for the individual assemblies in the circuit in accordance with FIG. 5b, for example:

Demultiplexer 33: Ser. No. 74154 Texas Instruments
Counter 34: Ser. No. 74163, Texas Instruments
Shift Registers $S_1$ through $S_{2k}$: MM 5058, National Semiconductors
Separators $W_1$ through $W_K$: In each case ¼ Ser. No. 74157 Texas Instruments FIGS. 6a through 6c illustrate the timing impulses for the control of the shift registers $S_1$ through $S_{2k}$ of FIGS. 5 and 5a. FIG. 6a illustrates in column A the case when the shift registers $S_1$ through $S_k$ are being filled and the registers $S_{k+1}$ through $S_{2k}$ are being read out in parallel. Column B illustrates the reverse case wherein the registers $S_{k+1}$ through $S_{2k}$ are being filled and the information is being read out in parallel from the registers $S_1$ through $S_k$. Wave form $T_S$ represents the timing rhythm and $T_{s1}$ through $T_{sk}$ respectively represents the timing sequence at which the registers $S_1$ through $S_k$ are filled. $T_{sk+1} \ldots T_{s2k}$ are the timing waves which control the parallel read-out of the associated registers. The wave shape $C_w$ is supplied to switches $W_1$. $W_k$ through line 51 from the timing generator 42 and controls the switch-over of the switches. Wave shape $C_T$ controls the timing when the gates $T'_1-T'_{2k}$ are switched on and off and a signal is supplied through line 52 from the timing generator 42, and these signals determine the write begin and write end and control the actual recording or writing time as well as the reversing time period for the writing head. The wave shape S is the signal which is derived from swich 523.

FIGS. 6b and 6c illustrate the impulse groups, drawn in FIG. 6a with an outline border, in more detailed resolution. In FIG. 6b the mode pulse $T_A$, the counter pulse $C_{34}$ for the counters 34 and 534, as well as the shift pulses $T_{S1}$ and $T_{S2}$ are illustrated which follow one another chronologically.

The read out pulses for the shift register $S_{k+1}$ through $S_{2k}$ are illustrated in FIG. 6c. The recording pulse $C_T$ for the AND-gates $T'_{k+1}$ through $T'_{2k}$, the machine pulse $T_S$, as well as the switching signals $C_w$ for the separators $W_1$ through $W_K$, and the voltage wave at the input of the flip-flop 524 which is furnished by the switch 523, is also illustrated in FIG. 6c.

Figure 7:
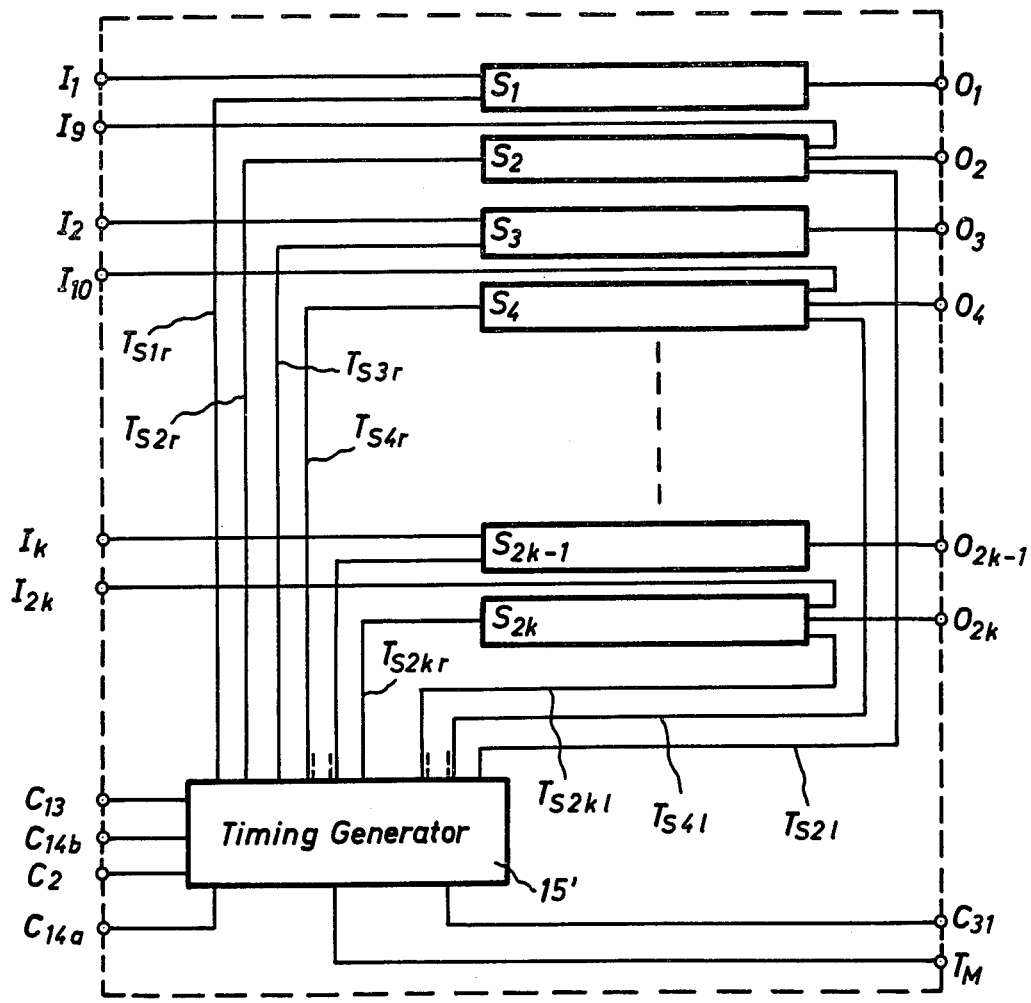
FIG. 7 illustrates in block form a modified memory device.

FIG. 7 illustrates an alternative to FIG. 3, in which a different shift register and pulse generator unit is utilized in order to scan the picture information with each back and forth movement of the scanning device during the scanning. The arrangement of FIG. 7 is made clear by using the same numbering of the inputs and outputs as was done in FIG. 3. FIG. 7 illustrates an arrangement in which the scanning device is guided back and forth across the paper, and provides input information in both directions without having an empty return run. In this case no idle time is caused by the reverse run since every run is used for the scanning. In this example, every second line is placed into a shift register group from right to left as described later in detail. The readout results as in the example of FIG. 3.

The shift impulses $T_{sl}$ for the left advance, and $T_r$ for the right advance are selected during the scanning in FIG. 7. In the sample embodiment of FIG. 7 the modules from the type MM 5058 by National Semiconductor can be used for the registers $S_1$, $S_3$, $S_5$ through $S_{2k-1}$, and either 256 modules of the type 74 S 291 by Texas Instruments or so-called RAM-memories can be used for the registers $S_2$, $S_4$ through $S_{2k}$. The module type 74 S 291 by Texas Instruments deals with a 4-bit right/left shift register from which 256 pieces (1024 bits) are connected together in order to accommodate a complete line length. The way these modules are connected together is the generally known technique and is called cascading.

Figure 7A:
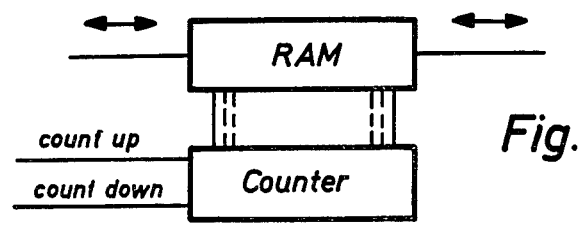
FIG. 7a is an example for the modified memory device of FIG. 7.

The other resolution, to use so-called RAM-memories instead of the right/left shift registers is illustrated in FIG. 7a. In this case, for example, addressable memories of type RAM (Random Access Memory) are used as intermediate stores for the picture signals. The principle of the re-sorting of the data is the same as in the utilization of shift registers. The information is placed into the storage with each movement of the scanning device and is placed in an alternating manner, into two different storage groups as it would be done with shift registers. In a practical sample embodiment, for example, a memory of the type AM 9102 PC of the firm AMD can be utilized which is available for 1024 bit. The memory is connected with a 10-bit-counter which can be formed from three modules of the type SN 74193, binary forward and backward counter of the firm Texas Instruments.

FIG. 7a illustrates the connection of the RAM and the forward and reverse counter. The memory has an input and an output. The counter has a forward and a reverse counting input respectively connected with the pulses sequences $T_{Sr}$ and $T_{Sl}$ (r=right, l=left) in FIG. 7. The mode of operation of this circuit is the same as a forward-reverse shift register.

Figure 7B:
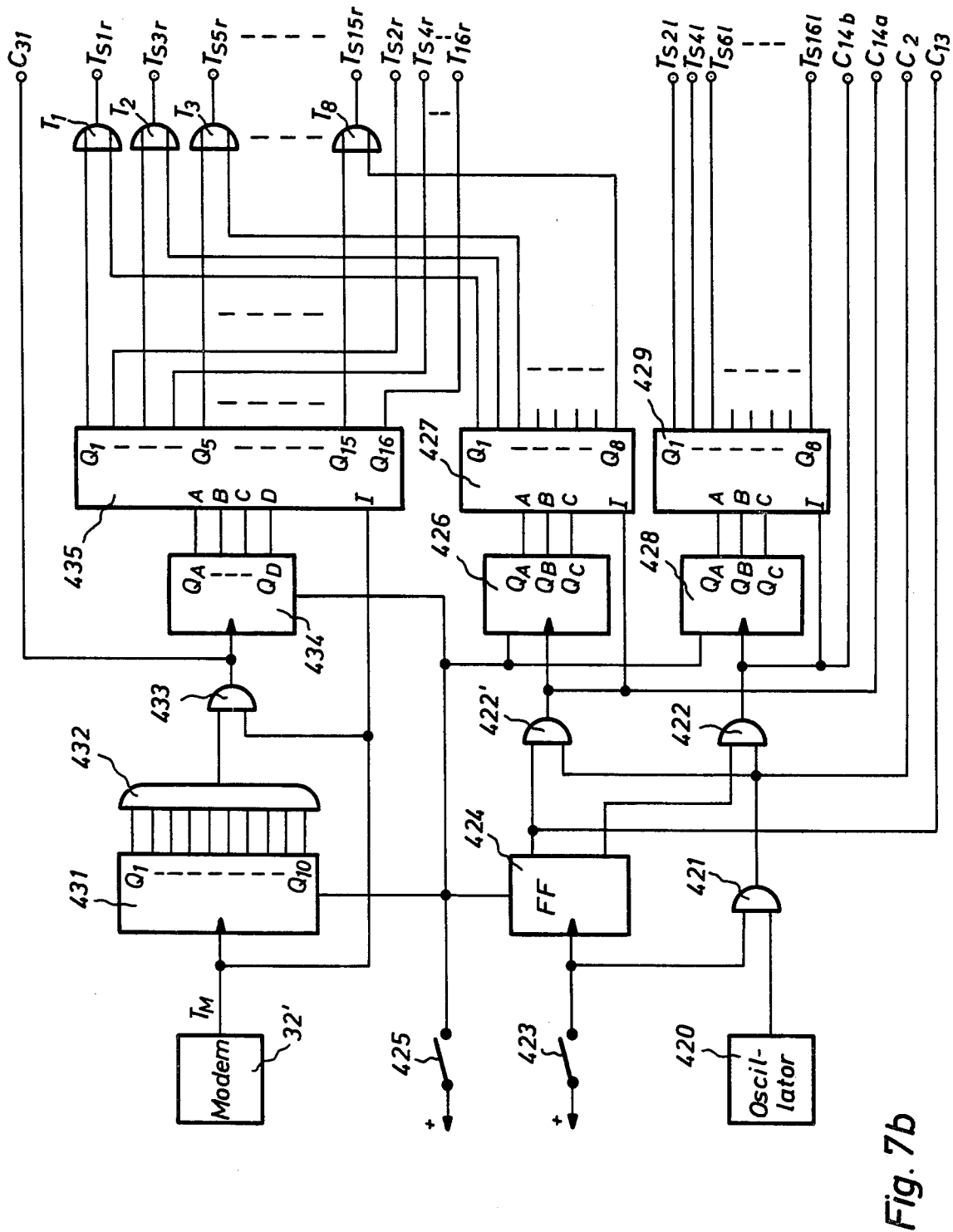
FIG. 7b is a circuit diagram for the timing generator of FIG. 7.

Since the pulse control for the example of FIG. 7 differs from the one of FIG. 3, a sample embodiment for the pulse generator 15' of FIG. 7 is provided in FIG. 7b. The structure of this pulse generator merely differs from the one of FIG. 3b in that the pulses for the left-triggering of the shift register are RAMs, respectively. The same reference numbers as used in FIG. 3 were used in FIG. 7b.

The portion of FIG. 7b relating to the triggering of the demultiplexer 427, 429 and 435, is identical with the corresponding portion of FIG. 3b and for this reason its function is here not described again. In the shift registers $S_1$, $S_3$, $S_5$ etc. the picture information is only shifted towards the right side and for this reason said information at the outlets $Q_1$, $Q_3$ through $Q_{15}$ of the demultiplexer 435 is given in the same manner as in FIG. 3b together with the outlets $Q_1$ through $Q_8$ of the demultiplexer 427 to the OR-gates $T_1 \ldots T_8$ etc. The outputs of these OR-gates result in the shift pulses $T_{s1r}$, $T_{s3r}$ through $T_{15r}$. The right shift pulse for the registers $S_2$, $S_4$, $S_6$ through $S_{16}$ is directly tapped from the outputs $Q_2$, $Q_4$ through $Q_{16}$ of the demultiplexer 435. The left shift pulses $T_{s21}$, $T_{s41}$ through $T_{s161}$ are obtained from the eight outlets $Q_1$ through $Q_8$. These left shift pulses facilitate the read-in of the picture information into the registers $S_2$, $S_4$, $S_8$ for the reverse run of the scanning device for no picture information was scanned in the example of FIG. 3.

The demultiplexer 435 supplies right shift impulses for all 16 registers, so as to read out the shiftregister $S_1$ through $S_{16}$ by supplying them with the shift right impulses $T_{s1r}$, $T_{s2r}$, ... $T_{s16r}$, one after another.

The demultiplexer 427 supplies the input impulses for the registers $S_1$ through $S_{15}$, and the demultiplexer 429 supplies the input impulses for the registers $S_2$ through $S_{16}$. Since the change-over switch, consisting of the gates 422 and 422' are controlled by the flip-flop 424 switches continuously, the input and the output pulses for the individual shift registers groups $S_1$, $S_3$, $S_{15}$, or $S_2$, $S_4$ through $S_{16}$ are continuously switched with each back and forth movement of the scanning device. The switching of the input information into these register groups is caused by the switch 13 of FIG. 3, and the connection of the registers to the distributor switches 13a and 13b results in FIG. 7 in an analogous manner outputs $Q_1$ through $Q_{2k}$, as well as for the control lines $C_{13}$, $C_{14}$, $C_{14a}$, $C_{14b}$, $C_2$, as well as $C_{31}$ and the mode pulse $T_M$ are connected in a manner similar to that shown in FIG. 3.

The present invention is not only applicable in recording apparatus outfitted with a multiple write head, but can also be used in all conventional facsimile write apparatus having a single write head or having multiple write heads since the transmission results in line sequence. The choice of the recording method, whether it be an ink-jet method, a carbonizing needle arrangement or multiple write heads, do not limit the invention.

Although the invention was described in regard to preferred sample embodiments, it is not limited by means of alterations or modifications which lie in the complete and intended range of the invention which is defined by means of the following patent claims.

We claim as our invention:

1. A transmitter including a flat-bed sensor for optic-electric sensing and recordation of picture patterns comprising, a sensing head means with multiple optic-electric converter means mounted for scanning the picture pattern line-by-line and capable of being advanced between scans, said multiple optic-electric converter means arranged in a row in the sensing head means, which row is perpendicular to the movement direction of said head means, and including a sensing line associated with each converter means, a plurality of shift register means connected to the converter means and the converter means are interrogated in synchronism and picture signals of sensed picture dots are supplied one after the other to the shift register means and correspond to the converter means which scan different lines in succession during interrogation including an advancing system means which after the scanning of the pattern by the sensing head means causes a relative step movement between the pattern and the sensing head means, comprising distribution switch means connected between said sensing lines and plurality of shift register means and the number of shift register means being equal to two times the number of converter means, said distribution switch means arranging said picture signals supplied to respective shift register means so that they are sorted line-by-line and stored in said shift register means and a multiplexer means connected to said shift register means and having an output wherein the output of said shift register means occurs one after the other.

2. A transmitter according to claim 1 wherein said distribution switch means consists of a switch, two counters with a timing input and having counting outputs, and two distribution switches with signal inputs, counting inputs and a number of signal outputs corresponding to the number of converter means, a timing generator producing an interrogation synchronism signal which is connected to timing inputs of said counters, the counting outputs of said counters connected to the counting inputs of said distribution switches, the signal inputs of said distribution switches connected to the signal outputs of said sensing lines and the signal outputs of said distribution switches respectively connected to said shift register.

3. A facsimile transmitter including a plural sensing element sensing head means mounted to scan across a picture transversely to sense a plurality of rows of said picture and to be periodically advanced longitudinally of said picture between transverse scans, a timing generator connected to said sensing head means, first and second distribution switch means, a two way switch connected to said timing generator and alternately switching the outputs of said sensing head means to said first and second distribution switch means, first and second plurality of memory devices with each plurality being equal to the number of said plural sensing elements, and the first plurality of memory devices connected to said first distribution switch means and the second plurality of memory devices connected to said second distribution switch means, and multiplex transmission means connected to said first and second plurality of memory devices to transmit line-by-line picture signals.

4. A facsimile transmitter according to claim 3 wherein said first and second plurality of memory devices are shift registers.

5. A facsimile transmitter according to claim 3 wherein said first and second plurality of memory devices are addressable memories.

* * * * *